Aug. 5, 1969 E. M. DEXTER 3,459,206
STATISTICAL DEVICE
Filed Oct. 22, 1965
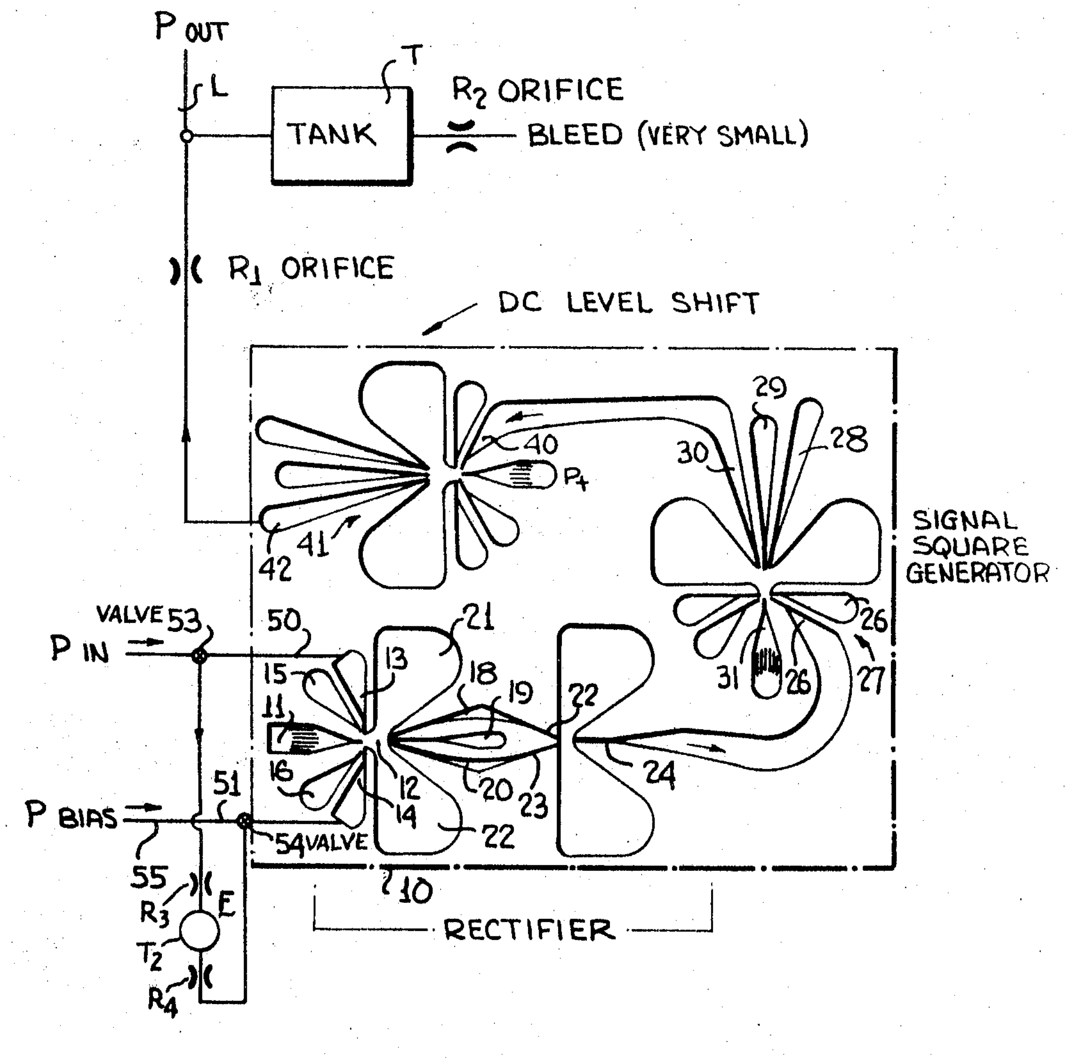
INVENTOR
EDWIN M. DEXTER
BY Hurvitz & Rose
ATTORNEYS United States Patent Office
3,459,206
Patented Aug. 5, 1969

3,459,206
STATISTICAL DEVICE
Edwin M. Dexter, Silver Spring, Md., assignor to Bowles Engineering Corporation, Silver Spring, Md., a corporation of Maryland
Filed Oct. 22, 1965, Ser. No. 501,970
Int. Cl. F15c *1/08*
U.S. Cl. 137—81.5 5 Claims

ABSTRACT OF THE DISCLOSURE

In accordance with the present invention, a relatively steady bias signal and a variable input signal are applied to a pure fluid rectifier. The bias signal may be maunally set, or be developed in terms of a computation of an arithmetic mean from the input signal itself. The rectifier has the function of rendering both positive and negative variations of the input signal, as compared with the bias signal, of the same algebraic sign, say positive. The rectified signal is passed through a pure fluid squaring device, and the squared signal amplified by a pure fluid amplifier which has the function of setting DC level to a suitable value. The output of the pure fluid amplifier is passed through an orifice, and thence proceeds to a tank, which is the fluid analog of an electrical capacitor. The capacitor is bled through a very small bleed orifice. The first mentioned orifice and the tank operate as a time constant or low pass filter, integrating and smoothing the varying signal applied thereto. The very small bleed orifice has the effect of restricting the time averaging of the pressure in the tank to reasonably current values of time, erasing long past time readings.

The present invention relates generally to pure fluid statistical computers, and more particularly to pure fluid mean square error computers.

In situations where a fluid flow $x$ fluctuates with respect to an arithmetic mean value of that flow $x_m$, a statistically significant number may be derived, representing the square of the standard deviation, known satistically as the variance, $\sigma_D^2$. Where the signals are discrete and countable, variance equals $$\frac{(x-x_m)^2}{n-1}$$

where $n$ is the number of signals involved. Where $x$ is continuously variable integration of $(x-x_m)^2$ is required, and the division factor becomes a time interval. If, moreover, $x_m$ is variable as a function of time, it must be computed. In either case, the result of past integrations must be continuously discarded as new values of the variables develop, so that a running computation is maintained of values of $x_m$ and of $\sigma_D^2$, for current time intervals, the latter being sufficiently long to be statistically significant.

In accordance with the present invention, a relatively steady bias signal and a variable input signal are applied to a pure fluid rectifier. The bias signal may be manually set, or be developed in terms of a computation of an arithmetic mean from the input signal itself. The rectifier has the function of rendering both positive and negative variations of the input signal, as compared with the bias signal, of the same algebraic sign, say positive. The rectified signal is passed through a pure fluid squaring device, and the squared signal amplified by a pure fluid amplifier which has the function of setting DC level to a suitable value. The output of the pure fluid amplifier is passed through an orifice, and thence proceeds to a tank, which is the fluid analog of an eletcrical capacitor. The capacitor is bled through a very small bleed orifice. The first mentioned orifice and the tank operate as a time constant or low pass filter, integrating and smoothing the varying signal applied thereto. The very small bleed orifice has the effect of restricting the time averaging of the pressure in the tank to reasonably current values of time, erasing long past time readings.

The extent of bleed must be carefully proportioned to the DC level applied to the tank, removing the latter as not statistically significant, but allowing signal variations to integrate for an adequate time to be statistically significant. Since all variations are positive, the bleed must be adjusted to provide a fixed value of pressure in the tank for zero signal. In this respect the tank and bleed are self-correcting, since bleed automatically increases as DC tank pressure increases.

It is, accordingly, a broad object of the invention to provide a novel pure fluid statistical computer.

It is a more specific object of the invention to provide a novel pure fluid computer for computing variance.

Another and subsidiary object of the present invention resides in the provision of a system for rectifying a pure fluid signal.

Still another object of the invention resides in the provision of a fluid integrating system useful in statistical computers.

The above and still further objects, features and advantages of the present invention will become apparent upon consideration of the following detailed description of one specific embodiment thereof, especially when taken in conjunction with the accompanying drawing, wherein:

The single figure of the drawing is a plan view of a pure fluid variance computer, according to the invention.

In the figure, 10 is a pure fluid amplifier including a power nozzle 11, issuing a fluid power jet into an interaction region 12. Control nozzles 13, 14 are positioned to provide opposed control jets transversely of the power jet, with the interaction region 12. Bleed-off passages 15, 16 communicate with interaction region 12 adjacent control nozzles 13, 14 and serve to maintain ambient conditions stable. The power jet flows toward three collection passages 18, 19, 20. Passage 19 is located intermediate passages 18 and 20 and vents to atmosphere. Passages 18 and 20 serve as analog signal collectors, the main jet normally dividing between passages 18, 19 when deflected in one sense, and between passages 20, 19 when deflected in the opposite sense, by the control jets. Chambers 21, 22 are vented chambers which serve to assure absence of boundary layer effects, so that the amplifier may operate in analog fashion. A DC bias signal may be applied to nozzle 14 and a time varying pure fluid signal to nozzle 13. In general, the bias signal may equal the arithmetic mean of the signal applied to nozzle 13, so that as the latter varies above and below the bias or average value, output signal appears in passages 20, 18. For an input signal equal to the arithmetic mean the power jet discharges from central passage 19.

The outputs of passages 18 and 20 are in the form of nozzles 22 and 23 and issue the signals appearing in passages 18 and 20 to a single common collector passage 24. Accordingly, signals appearing in passage 24 are always positive, regardless of the sign of the instantaneous signal appearing at control nozzle 13. But, this positive signal maintains, apart from algebraic sign, all the envelope of the signal applied to control nozzle 13.

The signal collected by collector passage 24 is applied as control signal to a control nozzle 26 of a pure fluid analog amplifier 27. The latter is zero biased, and has three output passages 28, 29, 30, for collecting a power jet issuing from a power nozzle 31. Nozzle 29 has a receiving port directly facing the power nozzle 31 and accordingly collects the entire jet in response to zero control signal. Passage 29 vents to atmosphere. As control signal at channel 28 increases in a positive sense the power jet is progressively deflected into channel 30. Channel 28 is useless.

By properly selecting the pressure at power nozzle 31, operation of the amplifier can be caused to take place on a curvilinear portion of the operating characteristic of amplifier 27, and to a close approximation the curvature of the characteristic is quadratic, so that output signal in channel 30 is proportional to the square of the input signal amplitude at control nozzle 26.

The signal present in passage 30 is applied as control signal to a control nozzle 40 of an amplifier 41, having the same general configuration as the amplifier 27, but which is arranged to operate linearly. Only one polarity of signal appears so that only output passage 42 collects useful signal, there being zero output signal for zero input signal. The purpose of amplifier 41 in the system is to increase the DC level at which operation takes place, by employing a relatively high power main jet. The DC signal output from amplifier 27 must be low, in order that operation can take place on a sufficiently curvilinear portion of its operating characteristic, and accordingly is not directly suitable for integration. The amplifier 41 provides a heavy flow of fluid as well as gain, in order that succeeding elements of the system may operate effectively, and with high signal-to-noise ratio.

Flow from passage 42 proceeds via a restrictive orifice $R_1$ to a tank T, which in turn vents to atmosphere via a very small bleed orifice $R_2$. The $R_1$ orifice is normally larger than the orifice $R_2$, the latter being perhaps of 0.003" D, i.e. of capillary size. Output signal is derived by line L, which measures pressure in tank T.

The resistance of orifice $R_1$ and the capacitance of tank T provide a time constant for build up of tank pressure which is long relative to the signal period, i.e. variations of $P_{in}$ takes place far more rapidly than $R_1T$ can follow. Accordingly, the orifice $R_1$ and the tank T can be looked at as a smoothing low pass filter, which provide essentially a DC pressure in response to a time varying input signal.

The bleed orifice $R_2$ provides a steady bleed-off of pressure from tank T, so that effective integration time extends back for only a limited time interval. Thereby integration extends back over a limited time interval, rather than to infinity and the pressure reading on line P (by any suitable instrument) provides a steady value if variance remains steady. To accomplish the desired integration, DC level supplied by amplifier 41 can be adjusted by controlling P+ at the power nozzle 43, since normally geometry of $R_1$, $R_2$ and T are not easily varied.

In order to provide an automatic bias signal, rather than a manually inserted bias, a smoothing filter F is connected at its input to the input line 50 to channel 13. Filter F has generally the same configuration as the integrator $R_1$, T, $R_2$ and is composed in cascade of a fluid resistance $R_3$, a tank $T_2$ representing a capacitance, and a bleed resistance $R_4$, connected to bias line 51. The restriction $R_4$ provides a flow proportional to pressure in tank $T_2$. Valve 53 permits diversion of signal into resistance $R_3$, while valve 54 shuts off the manually adjustable bias at 55, and substitutes automatic bias.

What I claim is:

1. A pure fluid statistical computer, comprising a source of a fluid bias signal equal to the arithmetic mean of a continuously varying fluid signal, pure fluid means continuously squaring the differences between said continuously varying fluid signal and said bias signal to provide a squared signal, means integrating said squared signal over a finite time interval wherein said means continuously squaring includes a pure fluid full wave rectifier responsive to said differences to provide a full wave rectified signal, and pure fluid means squaring said full wave rectified signal.

2. The combination according to claim 1 wherein is provided pure fluid computer means continuously computing said bias signal.

3. A pure fluid statistical computer, comprising a source of a first continuously varying fluid signal having random values with respect to a reference level, a source of a second relatively steady bias signal equal to said reference level, pure fluid means continuously deriving a third fluid signal instantaneously equal to the square of the difference between said continuously varying fluid signal and said relatively steady bias signal, means responsive to said third fluid signal for integrating said third fluid signal so as to provide a running average thereof taken over a constant time interval the initial point of which is a monotonic function of time said last means comprising an input resistive passage for said third fluid signal, a fluid capacitor connected in cascade with said input resistive passage, and a bleed-off high resistance connected in cascade with said fluid capacitor, the resistances of said passages and the capacitance of said capacitor providing an integration time approximately equal to said time interval, and means measuring fluid pressure in said tank as a measure of said running average.

4. The combination according to claim 3, wherein said reference level is intermediate the maximum and minimum values of said first continuously varying fluid signal.

5. The combination according to claim 3, wherein is further provided pure fluid means for computing said bias signal as a moving average function of said random values of said first continuously varying fluid signal.

References Cited

UNITED STATES PATENTS

| | | | |
|---|---|---|---|
| 3,155,825 | 11/1964 | Boothe | 137—81.5 XR |
| 3,185,166 | 5/1965 | Horton et al. | 137—81.5 |
| 3,228,410 | 1/1966 | Warren et al. | 137—81.5 |
| 3,238,959 | 3/1966 | Bowles | 137—81.5 |
| 3,250,469 | 5/1966 | Colston | 137—81.5 |
| 3,275,013 | 9/1966 | Colston | 137—81.5 |
| 3,302,398 | 2/1967 | Taplin et al. | 137—81.5 XR |
| 3,340,885 | 9/1967 | Bauer | 137—81.5 |

SAMUEL SCOTT, Primary Examiner

U.S. Cl. X.R.

235—201